US012574229B2

(12) United States Patent
Jang

(10) Patent No.: US 12,574,229 B2
(45) Date of Patent: Mar. 10, 2026

(54) COMPUTING DEVICE PROVIDING MERKLE TREE-BASED CREDIBILITY CERTIFICATION, STORAGE DEVICE, AND METHOD FOR OPERATING STORAGE DEVICE

(71) Applicant: SK hynix Inc., Icheon-si (KR)

(72) Inventor: In Jong Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 360 days.

(21) Appl. No.: 18/297,623

(22) Filed: Apr. 9, 2023

(65) Prior Publication Data

US 2024/0163090 A1 May 16, 2024

(30) Foreign Application Priority Data

Nov. 15, 2022 (KR) ......................... 10-2022-0152155

(51) Int. Cl.
H04L 9/08 (2006.01)
H04L 9/14 (2006.01)
(52) U.S. Cl.
CPC .......... H04L 9/0866 (2013.01); H04L 9/0825 (2013.01); H04L 9/14 (2013.01)
(58) Field of Classification Search
CPC ....... H04L 9/0866; H04L 9/0825; H04L 9/14; H04L 9/3239; H04L 9/50; H04L 9/0822; H04L 2209/08; G06F 21/64
See application file for complete search history.

(56) References Cited

U.S. PATENT DOCUMENTS

| | | | |
|---|---|---|---|
| 10,218,511 B2* | 2/2019 | Campagna | ............ H04L 9/0643 |
| 2019/0319932 A1* | 10/2019 | Kandregula | .......... H04L 67/306 |
| 2019/0332597 A1* | 10/2019 | Marelas | .............. G06F 11/1453 |
| 2021/0243009 A1* | 8/2021 | Kawahara | ............. H04L 9/3239 |
| 2021/0326442 A1* | 10/2021 | Campagna | .............. G06F 21/57 |
| 2023/0131062 A1* | 4/2023 | Kim | ...................... G06F 3/0679 |
| | | | 711/103 |

FOREIGN PATENT DOCUMENTS

| | | |
|---|---|---|
| KR | 10-2021-0103455 A | 8/2021 |
| KR | 10-2021-0134054 A | 11/2021 |

* cited by examiner

*Primary Examiner* — Mohammed Waliullah

(57) ABSTRACT

A storage device included in a computing device which provides Merkle tree-based credibility certification may generate a random hash value by hashing an erase count and a seed of each of a plurality of super blocks, may generate a Merkle tree in which the random hash value is a leaf node, for each of the plurality of super blocks, may generate a plurality of private keys corresponding to the plurality of super blocks, respectively, on the basis of root nodes of Merkle trees of the plurality of respective super blocks, and may transmit private key information including the plurality of private keys to a host device. The host device may use the private key information in credibility certification of the storage device.

20 Claims, 11 Drawing Sheets

| PKCNT | | | | | |
|---|---|---|---|---|---|
| PK1 | PK2 | . . . | | | |
| . . . | | | | | |
| . . . | | PKn | DK1 | DK2 | . . . |

Generate random hash value    ~S1110

Generate Merkle tree for
each of plurality of super blocks    ~S1120

Generate private key on the basis of
root node of Merkle tree and
store private key in memory    ~S1130

Transmit private key
information to external device    ~S1140

COMPUTING DEVICE PROVIDING MERKLE TREE-BASED CREDIBILITY CERTIFICATION, STORAGE DEVICE, AND METHOD FOR OPERATING STORAGE DEVICE

CROSS-REFERENCE TO RELATED APPLICATION

The present application claims priority under 35 U.S.C. § 119(a) to Korean Patent Application No. 10-2022-0152155 filed in the Korean Intellectual Property Office on Nov. 15, 2022, which is incorporated herein by reference in its entirety.

BACKGROUND

1. Technical Field

Various embodiments generally relate to a computing device providing Merkle tree-based credibility certification, a storage device, and a method for operating a storage device.

2. Related Art

A storage device is a device that stores data according to a request from a host such as a computer, a mobile terminal such as a smartphone and a tablet, or various electronic devices.

The storage device may include a controller for controlling a memory (e.g., a volatile memory/a nonvolatile memory) included in the storage device. The controller may receive a command from the host, and may execute or control an operation for reading, writing or erasing data with respect to the memory, consistent with the received command.

To establish the security of data stored in a storage device, a method for requesting mutual credibility certification between a host and the storage device is required.

SUMMARY

Various embodiments are directed to providing a computing device that provides Merkle tree-based credibility certifications capable of identifying each other, by using private keys generated through Merkle trees, a storage device and a method for operating a storage device.

Various embodiments are directed to providing a computing device that provides Merkle tree-based credibility certification capable of updating private keys on the basis of an operation of a storage device, a storage device and a method for operating a storage device.

In an embodiment, a computing device may include: a storage device configured to generate a random hash value by hashing an erase count and a seed of each of a plurality of super blocks, to generate a Merkle tree in which the random hash value is a leaf node, for each of the plurality of super blocks, to generate a plurality of private keys corresponding to the plurality of super blocks, respectively, on the basis of root nodes of Merkle trees of the plurality of respective super blocks, and to transmit private key information including the plurality of private keys to a host device.

The computing device may further include: a host device configured to transmit a credibility certification request to the storage device, to determine a credibility certification result by comparing a plurality of private keys received as a response to the credibility certification request and previously received private key information, and to transmit the credibility certification result to the storage device.

In an embodiment, a storage device may include: a memory including a plurality of memory blocks that are divided into a plurality of super blocks; and a controller configured to generate a random hash value by hashing an erase count and a seed of each of the plurality of super blocks, to generate a Merkle tree in which the random hash value is a leaf node, for each of the plurality of super blocks, to generate private keys corresponding to the plurality of super blocks, respectively, on the basis of root nodes of Merkle trees of the plurality of respective super blocks and store the private keys in the memory, and to transmit private key information including the private keys to an external device.

In an embodiment, a method for operating a storage device may include: generating a random hash value by hashing an erase count and a seed of each of a plurality of super blocks; generating a Merkle tree in which the random hash value is a leaf node, for each of the plurality of super blocks; generating a private key of each of the plurality of super blocks on the basis of a root node of the Merkle tree of each of the plurality of super blocks, and storing the private key in a memory; and transmitting private key information including the private key of each of the plurality of super blocks to an external device.

According to the embodiments of the disclosed technology, by updating private keys on the basis of an operation of a storage device, coupling to another host or another storage device may be prevented or blocked, thereby increasing a security level between a host and a storage device.

BRIEF DESCRIPTION OF THE DRAWINGS

FIG. 5 is a diagram illustrating an example of private key information according to an embodiment of the disclosure.

DETAILED DESCRIPTION

Hereinafter, embodiments of the disclosed technology will be described in detail with reference to the accompanying drawings.

Figure 1:
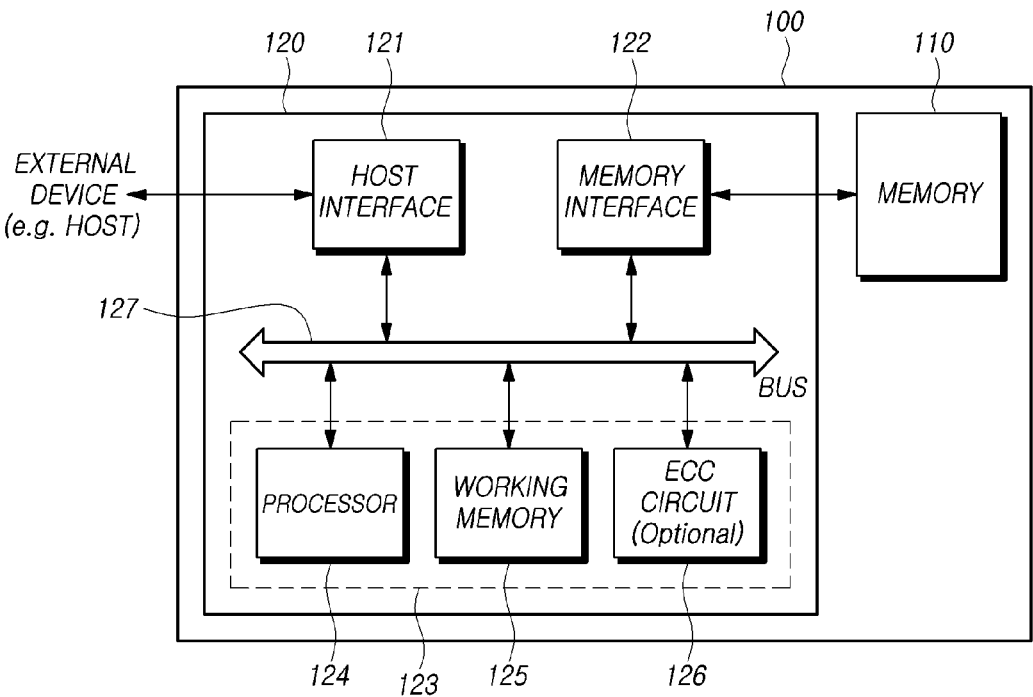
FIG. 1 is a schematic configuration diagram of a storage device according to an embodiment of the disclosure.

FIG. 1 is a schematic configuration diagram of a storage device according to an embodiment of the disclosure.

Referring to FIG. 1, a storage device 100 may include a memory 110 that stores data, and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells"), which store data. Such a memory cell array may exist in a memory block.

For example, the memory 110 may be realized into various types such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (SU-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area that is selected by the address in the memory cell array. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. On the other hand, the controller 120 may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multi-media player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) traveling on land or water or in air under human control or traveling autonomously, etc.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be implemented by being integrated into one device. Hereafter, for the sake of convenience in explanation, embodiments will be described with the controller 120 and the host separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, embodiments of an operation of the storage device 100 will be described as implemented in such a way that the processor 124 executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL) which serves to analyze a command requested to the storage device 100 as a storage device from the host and transfer the command to the flash translation layer (FTL); and a flash interface layer (FIL) which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is not loaded in the working memory 125, the processor 124 may generate an event (e.g., an interrupt) for loading the corresponding part of the firmware in the working memory 125.

The processor 124 may load metadata necessary for driving firmware, from the memory 110. The metadata, as data for managing the memory 110, may include management information on user data stored in the memory 110.

Firmware may be updated while the storage device 100 is manufactured or while the storage device 100 is executed. The controller 120 may download new firmware from the outside of the storage device 100 and update existing firmware with the new firmware.

The working memory 125 may store firmware, a program code, a command and data that are necessary to drive the controller 120. A working memory 125 may be, for example, a volatile memory that includes at least one among an SRAM (static RAM), a DRAM (dynamic RAM) and an SDRAM (synchronous DRAM).

The error detection and correction circuit 126 may detect an error bit of target data and correct the detected error bit, by using an error correction code. The target data may be, for example, data stored in the working memory 125 or data read from the memory 110.

The error detection and correction circuit 126 may be implemented to decode data by using an error correction code. The error detection and correction circuit 126 may be implemented by various code decoders. For example, a decoder that performs unsystematic code decoding or a decoder that performs systematic code decoding may be used.

For example, the error detection and correction circuit 126 may detect an error bit by the unit of a set sector in each of read data. Each read data may be constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not in the unit of sector. For example, when a bit error rate (BER) is higher than a set reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, the error detection and correction circuit 126 may detect a sector which is determined to be uncorrectable. There may be one or more sectors that are determined to be uncorrectable. The error detection and correction circuit 126 may transfer information (for example, address information) on a sector which is determined to be uncorrectable, to the processor 124.

A bus 127 may be configured to provide channels among the components 121, 122, 124, 125 and 126 of the controller 120. The bus 127 may include, for example, a control bus for transferring various control signals, commands and the likes, a data bus for transferring various data, and so forth.

Some of the components among the above-described components 121, 122, 124, 125 and 126 of the controller 120 may be omitted, or some of the components among the above-described components 121, 122, 124, 125 and 126 of the controller 120 may be integrated into one component. In other embodiments, one or more other components may be added in addition to the above-described components 121, 122, 124, 125 and 126 of the controller 120.

Hereinbelow, the memory 110 will be described in further detail with reference to FIG. 2.

Figure 2:
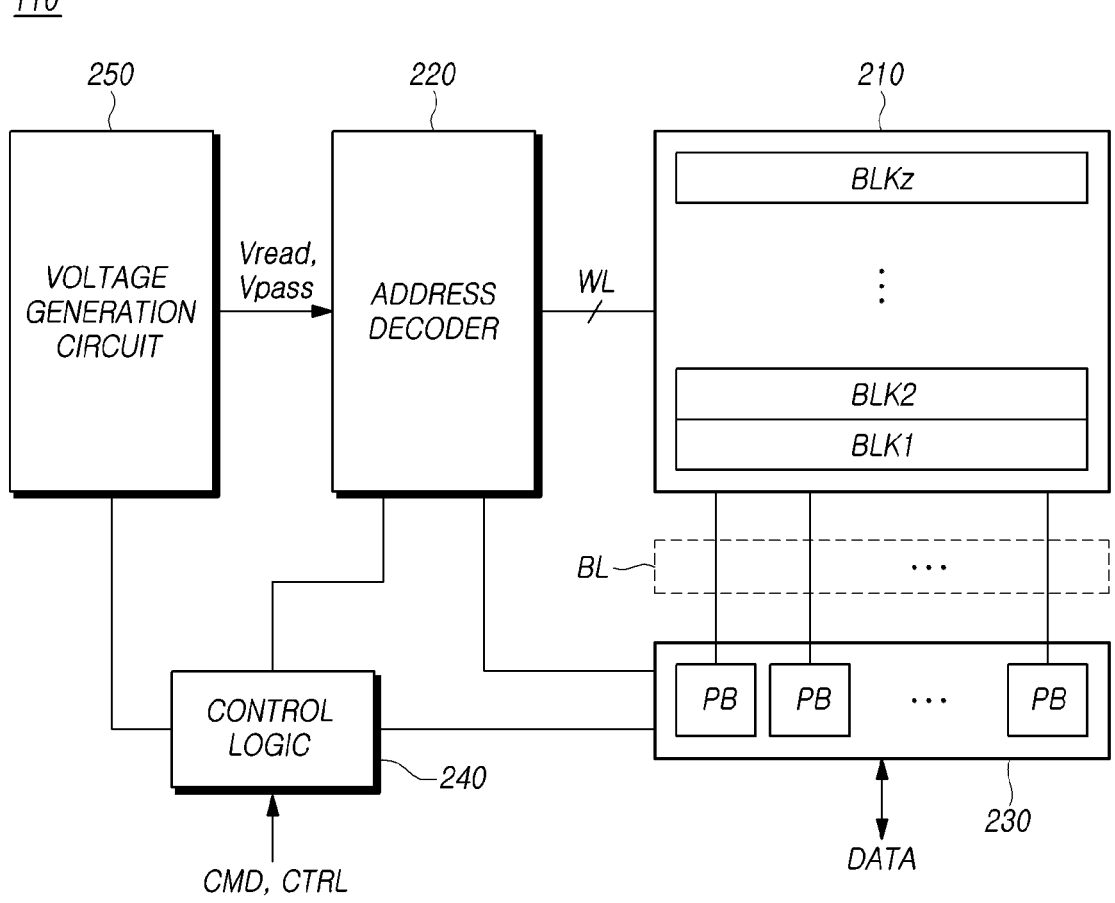
FIG. 2 is a block diagram schematically illustrating a memory of FIG. 1.

FIG. 2 is a block diagram schematically illustrating a memory of FIG. 1.

Referring to FIG. 2, a memory 110 according to an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and writhe circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

In a read voltage applying operation, during a read operation the address decoder 220 may apply the read voltage Vread to a selected word line WL in a selected memory block, and may apply the pass voltage Vpass to the remaining unselected word lines WL.

In a program verify operation, the address decoder 220 may apply a verify voltage generated in the voltage generation circuit 250 to a selected word line WL in a selected memory block, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address. The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line WL more adjacent to the read and write circuit 230 between two outermost word lines, and a second select line (also referred to as a drain select line or a source select line) may be additionally disposed outside a second outermost word line between the two outermost word lines WL.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
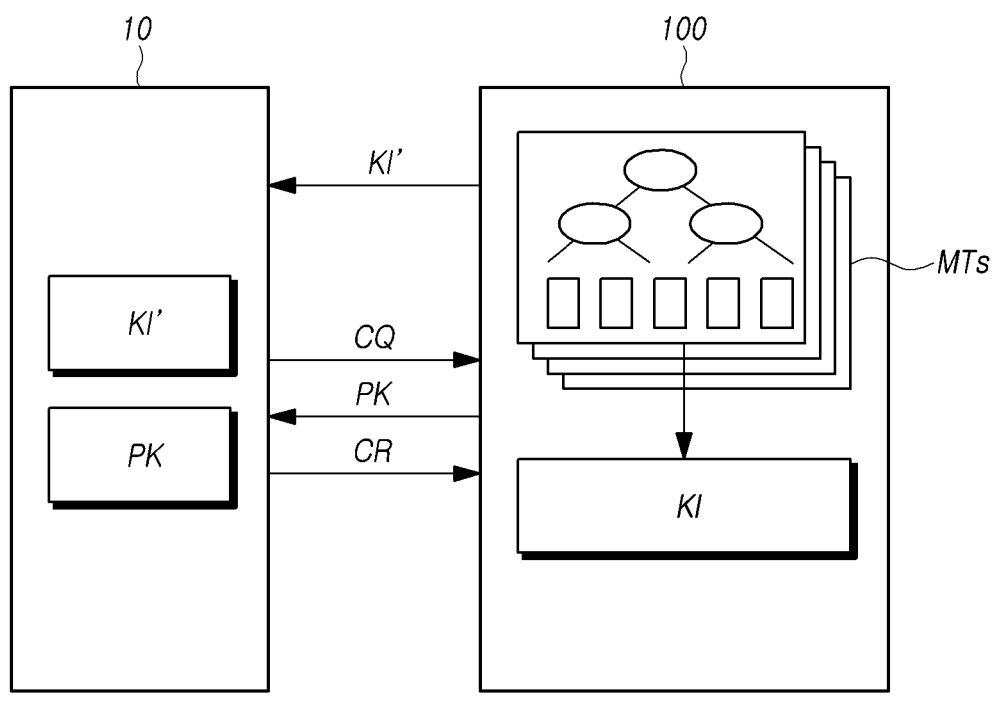
FIG. 3 is a diagram illustrating a host device and a storage device according to an embodiment of the disclosure.

FIG. 3 is a diagram illustrating a host device and a storage device according to an embodiment of the disclosure.

Referring to FIG. 3, a storage device 100 may transmit private key information KI' to a host device 10.

The storage device 100 may generate a plurality of Merkle trees MTs corresponding to a plurality of super blocks, respectively, and may transmit the private key information KI' including private keys generated on the basis of root nodes of the Merkle trees MTs to the host device 10.

A super block is a set of one or more memory blocks, and may be set to improve parallel processing performance. The storage device 100 may erase stored data by the unit of super block.

Detailed descriptions will be made with reference to FIGS. 6 to 10 regarding private key generation by the storage device 100.

The host device 10 may transmit a credibility certification request CQ to the storage device 100.

The credibility certification request CQ is a request that is transmitted by the host device 10 to check the storage device 100. When transmitting the credibility certification request CQ, the host device 10 may transfer, together, a plurality of private keys included in the previously received private key information KI' to the storage device 100.

In response to the credibility certification request CQ received from the host device 10, the storage device 100 may transmit a plurality of private keys PK stored in a memory 110 of the storage device 100 to the host device 10.

The host device 10 may determine a credibility certification result CR by comparing the plurality of private keys PK received from the storage device 100 as a response to the credibility certification request CQ and the previously received private key information KI'. When the plurality of private keys PK received by the host device 10 as a response to the credibility certification request CQ completely matches the plurality of private keys included in the previously received private key information KI', the host device 10 may determine the credibility certification result CR as a pass. On the other hand, when the plurality of private keys PK received by the host device 10 as a response to the credibility certification request CQ does not entirely match, even by a single key, the plurality of private keys included in the previously received private key information KI', the host device 10 may determine the credibility certification result CR as a fail.

When the host device 10 determines the credibility certification result CR as a pass, the host device 10 may confirm that the storage device 100 is a previously used device and thus the host device 10 accredits the storage device 100. On the other hand, when the host device 10 determines the credibility certification result CR as a fail, the host device 10 confirms that data stored in the storage device 100 is changed through another means or the storage device 100 corresponds to a storage device 100 copied from an original storage device 100, and as a result the host device 10 does not accredit the storage device 100.

The host device 10 may transmit the credibility certification result CR to the storage device 100. Each of the host device 10 and the storage device 100 may take a follow-up action on the basis of the credibility certification result CR. For example, when the credibility certification result CR is a pass, the host device 10 may access the storage device 100 in a normal or usual way such as writing data to the storage device 100 or reading data stored in the storage device 100. On the other hand, when the credibility certification result CR is a fail, the host device 10 may block read and/or write access to the storage device 100. In these examples, credibility certification of the storage device 100 is implemented on the side of the host device 10.

In addition, when the storage device 100 receives the credibility certification request CQ from the host device 10, the host device 10 may transfer, together, the plurality of private keys included in the previously received private key information KI', and the storage device 10 may compare private key information KI stored in the memory 110 and the private keys received from the host device 10. In this way, credibility certification of the host device 10 may be implemented on the side of the storage device 100. That is to say, the host device 10 and the storage device 100 may each check the credibility certification of the other.

Figure 4:
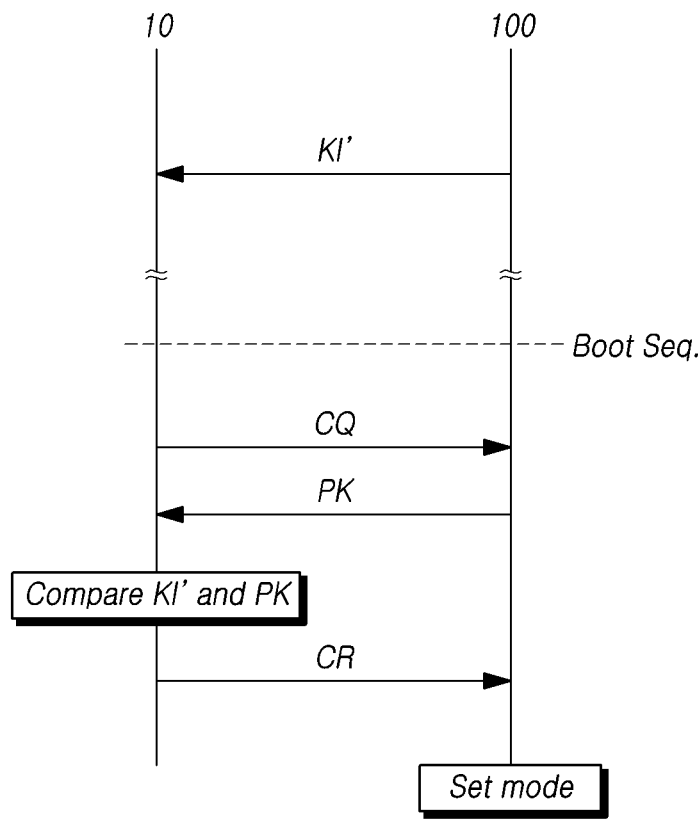
FIG. 4 is a diagram illustrating credibility certification during a boot sequence of a storage device according to an embodiment of the disclosure.

FIG. 4 is a diagram illustrating credibility certification during a boot sequence of a storage device according to an embodiment of the disclosure.

Referring to FIG. 4, a host device 10 may transmit a credibility certification request CQ to a storage device 100 during a boot sequence Boot Seq. of the storage device 100.

The storage device 100 may receive the credibility certification result CR determined by the host device 10. The storage device 100 may be set to one of a normal mode and an emergency mode according to the credibility certification result CR.

The host device 10 may receive the private key information KI' from the storage device 100 before the boot sequence Boot Seq. of the storage device 100 starts.

As described above, during the boot sequence Boot Seq. of the storage device 100, various operations, such as operations in which the storage device 100 is initialized and firmware is loaded in the working memory 125, may be performed.

The host device 10 may transmit the credibility certification request CQ during the boot sequence Boot Seq. after the storage device 100 is powered on, and then, may determine the credibility certification of the storage device 100 on the basis of the plurality of private keys PK received from the storage device 100.

When the credibility certification result CR received from the host device 10 is deemed a pass by the storage device 100, the storage device 100 may be set to the normal mode. When the storage device 100 is set to the normal mode, the storage device 100 may operate normally.

On the other hand, when the credibility certification result CR received from the host device 10 is deemed a fail by the storage device 100, the storage device 100 may be set to the emergency mode. When the storage device 100 is set to the emergency mode, the storage device 100 may perform a preset operation such as data recovery, rebooting or freezing. Also, when the storage device 100 is set to the emergency mode, access of the host device 10 to the storage device 100 may be prevented.

The credibility certification result CR transmitted to the storage device 100 from the host device 10 may include a request for setting a mode of the storage device 100. For example, when the host device 10 transmits the credibility certification result CR corresponding to a fail to the storage device 100, an emergency mode booting request may be included and transmitted. The storage device 100 may be immediately booted in the emergency mode through the received emergency mode booting request during the boot sequence Boot Seq.

The host device 10 corresponds to a host of FIG. 1.

Figure 5:
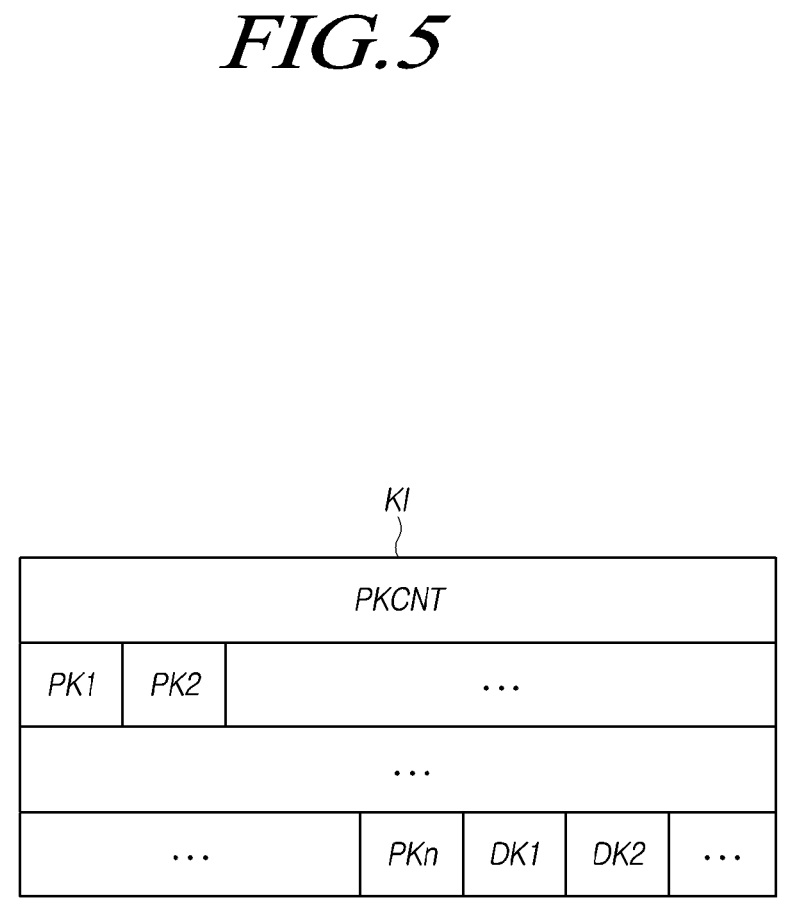

FIG. 5 is a diagram illustrating an example of private key information according to an embodiment of the disclosure.

Referring to FIG. 5, private key information KI may include private keys PK1, PK2, . . . , PKn of a plurality of respective super blocks, one or more dummy keys DK1, DK2, . . . and a number PKCNT of private keys.

The storage device 100 may generate a private key PK corresponding to each of super blocks, and the number PKCNT of private keys PK may correspond to the number of the plurality of super blocks. The one or more dummy keys DK1, DK2, . . . included in the private key information KI correspond to keys that are not directly involved in the credibility certification between the host device 10 and the storage device 100. The one or more dummy keys DK1, DK2, . . . may be stored as random values or may be transmitted with random values each time the dummy keys are transmitted to the host device 10. The one or more dummy keys DK1, DK2, . . . may be used by the host device 10 or the storage device 100. For example, the one or more dummy keys DK1, DK2, . . . may be modified by the host device 10 or the storage device 100. Even though the private keys PK are directly involved in the credibility certification between the host device 10 and the storage device 100 and the one or more dummy keys DK1, DK2, . . . are not directly involved in the credibility certification between the host device 10 and the storage device 100, but the one or more dummy keys DK1, DK2, . . . may be indirectly used by the host device 10 or the storage device 100 since the one or more dummy keys DK1, DK2, . . . are included in the private key information KI.

For example, since the dummy keys DK1, DK2, . . . may be modified even if the same private keys PK1, PK2, . . . , PKn are included in the previously received private key information KI' and the plurality of private keys PK received by the credibility certification request CQ, different data may be transferred. Even though the same private keys PK1, PK2, . . . , PKn are included in the private key information KI', the private key information KI' may be different according to the dummy keys DK1, DK2, . . . included in the private key information KI'. The same private keys PK1, PK2, . . . , PKn may be transmitted and received by different private key information KI'. As a result, the difficulty of credibility certification between the host device 10 and the storage device 100 may increase.

The host device 10 may identify the private keys PK and dummy keys DK by using the number PKCNT of private keys. The host device 10 may identify a valid private key on the basis of the size of each private key and the number PKCNT of private keys. According to the illustration of FIG. 5, when the number PKCNT of private keys is n, and the plurality of private keys PK1, PK2, . . . , PKn correspond to a total of n. The host device 10 may compare the valid private keys PK1, PK2, . . . , PKn and the private keys PK received as a response to the credibility certification request CQ.

When transmitting the plurality of private keys PK as a response to the credibility certification request CQ, the storage device 100 may further include and transmit one or more dummy keys DK. Through this, it is possible to make it difficult for the host device 10 to know the exact number of private keys. And the one or more dummy keys DK may be changed to the private keys PK corresponding to one of the super blocks. Thus, it is possible to secure a margin for the number of super blocks.

The host device 10 may identify the plurality of private keys PK and the one or more dummy keys DK received as a response to the credibility certification request CQ, on the basis of the number PKCNT of private keys included in the previously received private key information KI', and may perform credibility certification by comparing the plurality of private keys PK received as a response to the credibility certification request CQ and the private keys included in the previously received private key information KI'.

Figure 6:
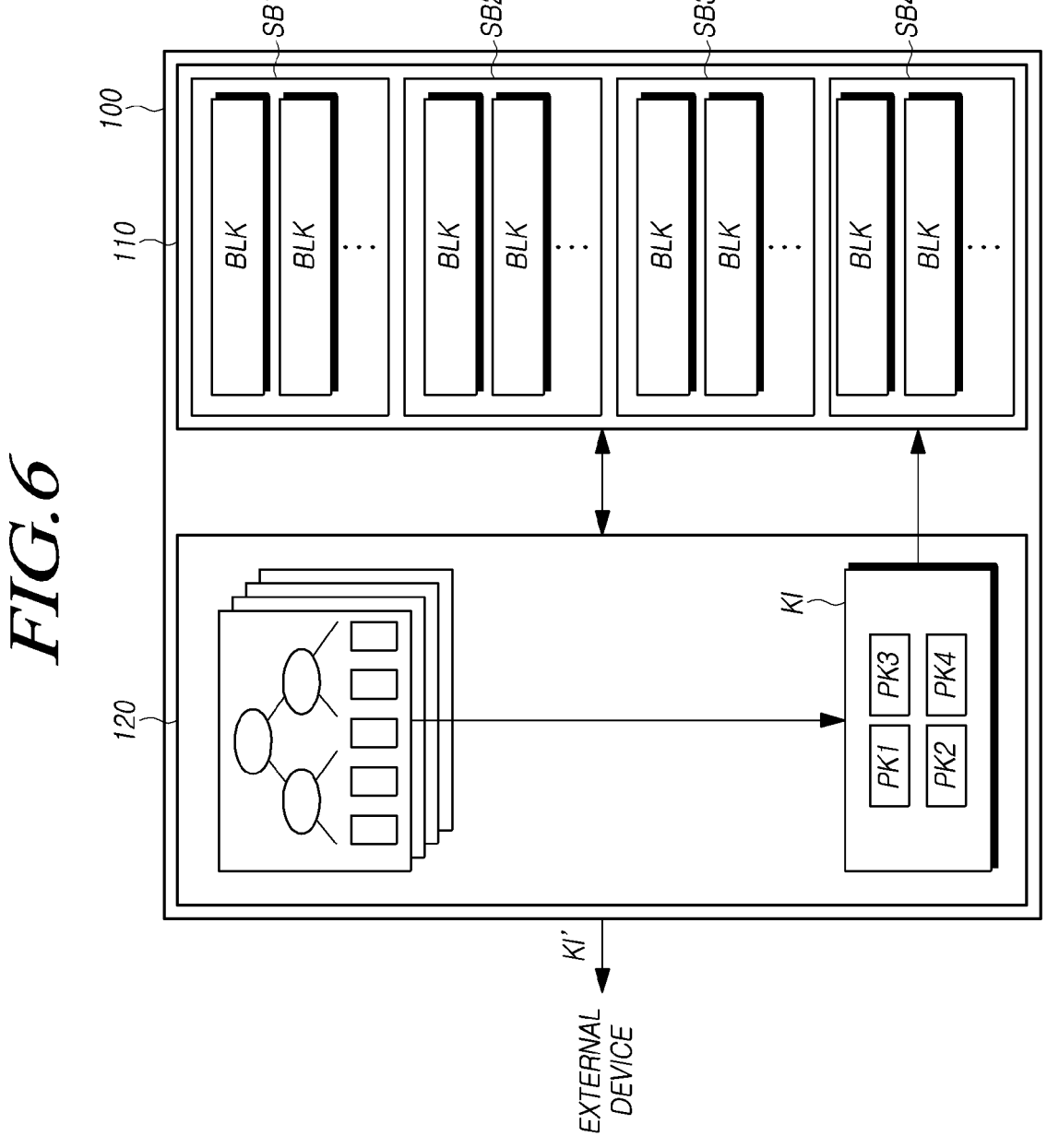
FIG. 6 is a diagram illustrating a memory and a controller included in the storage device according to an embodiment of the disclosure.

FIG. 6 is a diagram illustrating a memory and a controller included in the storage device according to an embodiment of the disclosure.

Referring to FIG. 6, a storage device 100 may include a memory 110, which includes a plurality of memory blocks BLK divided into a plurality of super blocks SB.

As described above, a controller 120 may group one or more memory blocks BLK into one super block SB. In FIG. 6, the plurality of memory blocks BLK are grouped into a first super block SB1, a second super block SB2, a third super block SB3 and a fourth super block SB4. These super blocks SB1, SB2, SB3 and SB4 are exemplary, and the number of memory blocks BLK and the number and grouping of super blocks SB may vary in number.

The storage device 100 may include the controller 120, which generates a random hash value by hashing the erase count and seed of each of the plurality of super blocks SB; generates, for each of the plurality of super blocks SB, a Merkle tree MT in which the random hash value is a leaf node; generates private keys PK corresponding to the plurality of super blocks SB, respectively, on the basis of root nodes of Merkle trees MT of the plurality of super blocks SB and stores the private keys PK in the memory 110; and transmits the private key information KI' including the private keys PK to an external device.

As described above with reference to FIG. 1, the controller 120 may randomize data received from the external device, through a processor 124 included in the controller 120. The controller 120 may randomize data received from the external device, by using a set randomizing seed, and the randomized data may be provided to the memory 110 and may be programmed to a memory cell array included in a memory block of the memory 110. Through randomization of data, dispersion of a program voltage (PV) of the memory 110 may be made uniform, and degradation of memory cells may be prevented. The seed hashed to generate the random hash value may be the randomizing seed.

The controller 120 may generate a random hash value by hashing the erase count and randomizing seed of the super block SB. Meanwhile, a hash function for hashing the erase count and the randomizing seed may be used. The hash function as a one-way function whose output has a fixed length is determined in its output by an input, but it is difficult to determine the input on the basis of the output. As the hash function, various functions including SHA-1 (Secure Hash Algorithm 1), SHA-256 and SHA-512 may be used.

The controller 120 may generate private keys PK1, PK2, PK3 and PK4 corresponding to the super blocks SB1, SB2, SB3 and SB4 and store them in the memory 110. The controller 120 may generate the private key information KI including the private keys PK1, PK2, PK3 and PK4 and store the private key information KI in the memory 110.

The controller 120 may transfer the private key information KI to the external device. The private key information KI may be used in credibility certification between the external device and the storage device 100.

Figure 7:
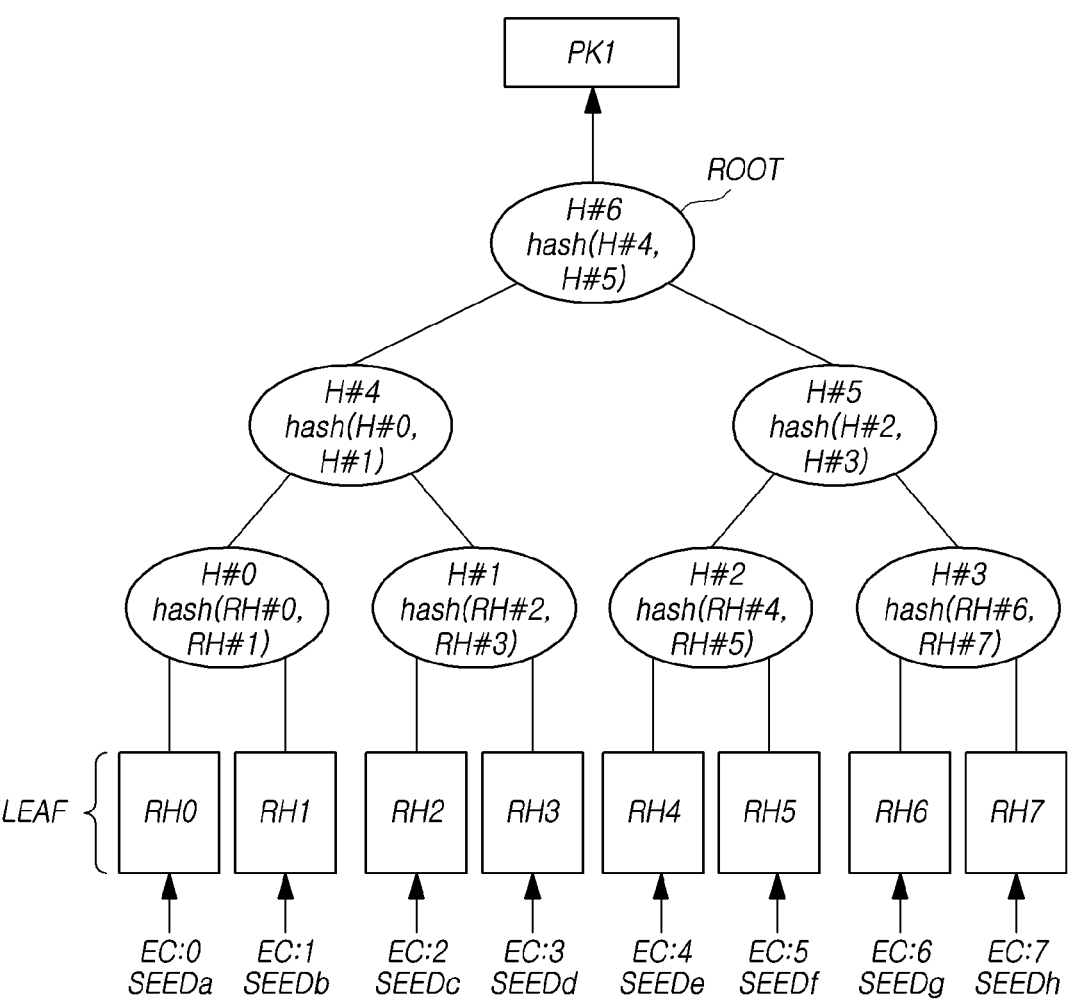
FIG. 7 is a diagram illustrating an example of a Merkle tree and a private key of one super block according to an embodiment of the disclosure.

FIG. 7 is a diagram illustrating an example of a Merkle tree and a private key of one super block according to an embodiment of the disclosure.

Referring to FIG. 7, a controller 120 may generate a random hash value RH on the basis of an erase count EC and a seed SEED of a super block.

It is assumed that a Merkle tree of FIG. 7 is a Merkle tree corresponding to a first super block SB1. Each time the first super block SB1 is erased, an erase count increases by 1. A random hash value RH0 is a value obtained by hashing the erase count EC of 0 and a seed SEEDa, which is a seed when the erase count EC is 0, through a hash function. The random hash value RH0 serves as one of the leaf nodes of the Merkle tree.

Each time the erase count EC increases, the controller 120 may generate the random hash value RH by hashing the corresponding erase count EC and the seed SEED. A random hash value RH7 is a random hash value, which is generated when the erase count EC is 7.

The controller 120 may generate the Merkle tree in which random hash values RH0, RH1, . . . , RH7 for respective erase counts EC serve as leaf nodes. A parent node H #0 of the random hash value RH0 and the random hash value RH1 has a value hash (RH #0, RH #1) obtained by hashing the random hash value RH0 and the random hash value RH1. Similarly, a node H #1 has a value hash (RH #2, RH #3) obtained by hashing the random hash value RH2 and the random hash value RH3. A node H #4 has a value hash (H #0, H #1) obtained by hashing the node H #0 and the node H #1 corresponding to child nodes.

A root node ROOT of the Merkle tree is a node H #6, and has a value hash (H #4, H #5) as a hash value of child nodes. That is to say, the root node ROOT of the Merkle tree is a node in which the random hash values RH0, RH1, . . . , RH7 corresponding to leaf nodes LEAF are reflected.

The controller 120 may generate a private key corresponding to the super block on the basis of the root node ROOT of the Merkle tree, which is generated on the basis of the erase count EC of the super block and the seed SEED according to the erase count EC.

Figure 8:
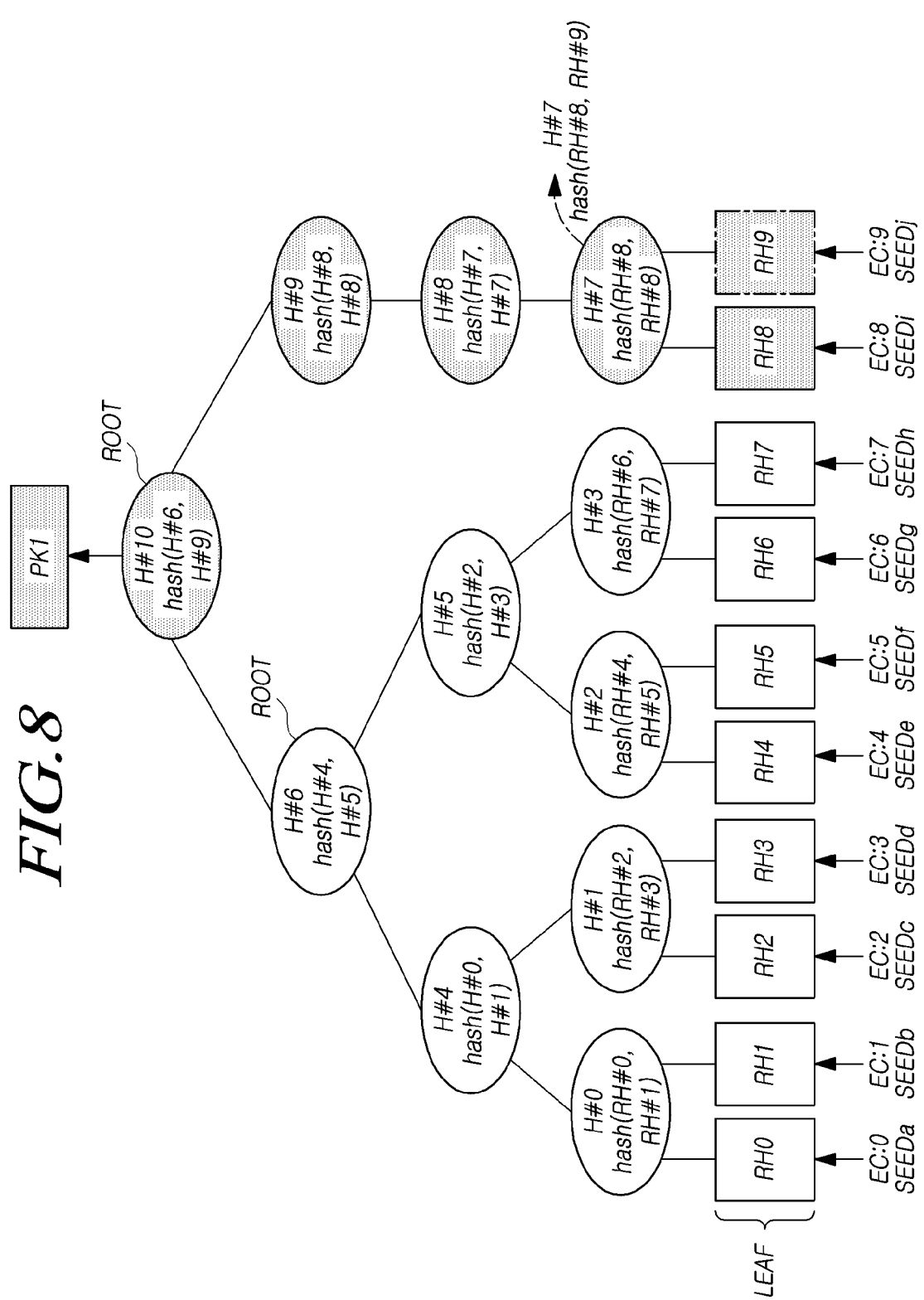
FIG. 8 is a diagram illustrating an example of update of a Merkle tree according to an embodiment of the disclosure.

FIG. 8 is a diagram illustrating an example of update of a Merkle tree according to an embodiment of the disclosure.

Referring to FIG. 8, when one super block among the super blocks is erased, a controller 120 may increase an erase count of an erased super block, may add a random hash value corresponding to the increased erase count to leaf nodes of a Merkle tree corresponding to the erased super block, and may update the Merkle tree corresponding to the erased super block and a private key of the erased super block.

A situation is assumed where, in a state in which the existing erase count EC is 7, a new erase operation is performed on the first super block SB1 and thus the erase count EC increases by 1.

A random hash value RH8 may be generated by hashing the erase count EC of 8 and a seed SEEDi corresponding thereto. Since a parent node H #7 of the random hash value RH8 has only one child node, the parent node H #7 has a value hash (RH #8, RH #8) obtained by hashing the random hash value RH8 and the same value RH8. A node H #8 has a value hash (H #7, H #7) obtained by hashing the child node H #7. Similarly, a node H #9 has a value hash (H #8, H #8). A root node ROOT H #10 has a value hash (H #6, H #9) obtained by hashing child nodes.

A situation is assumed in which a new erase operation is performed on the first super block SB1 in the corresponding state and the erase count EC is increased by 1 to be 9.

A random hash value RH9 may be generated by hashing the erase count EC of 9 and a seed SEEDj corresponding thereto. Since the node H #7 has two children, the node H #7 has a value hash (RH #8, RH #9). The node H #8, the node H #9 and the node H #10 may be updated due to the addition of a new random hash value RH9.

As the root node ROOT of the Merkle tree corresponding to the first super block SB1 is updated, the private key PK1 corresponding to the first super block SB1 may also be updated.

When at least one private key among the private keys of the plurality of respective super blocks is updated, the controller 120 may transmit the private key information KI' including the updated private key PK to the external device.

The private key information KI' transmitted to the external device may be used subsequently in the credibility certification between the external device and the storage device 100.

Figure 9:
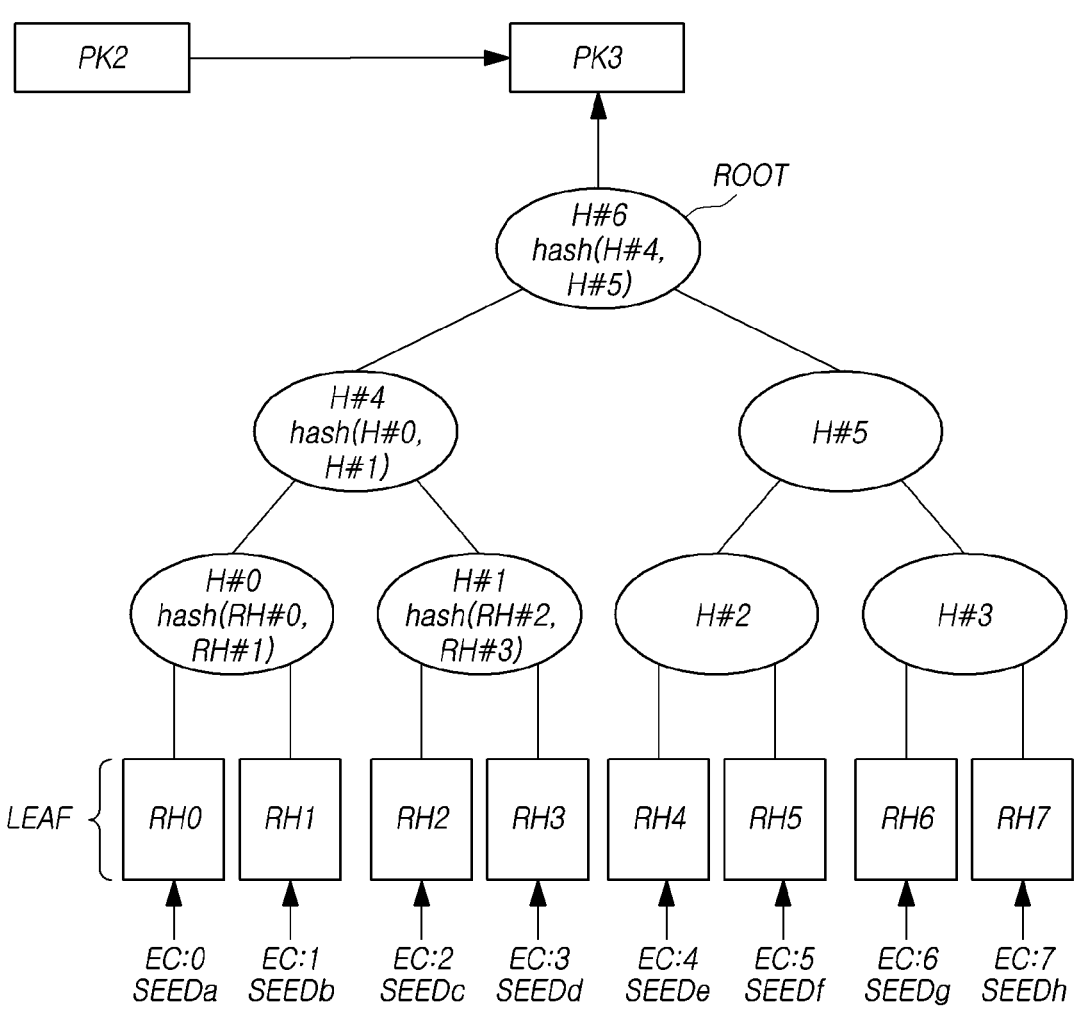
FIG. 9 is a diagram illustrating another example of a private key of a super block according to an embodiment of the disclosure.

FIG. 9 is a diagram illustrating another example of a private key of a super block according to an embodiment of the disclosure.

Referring to FIG. 9, a private key of one super block may be generated on the basis of a root node ROOT of a Merkle tree of the one super block and a private key of another super block.

It is assumed that a super block corresponding to the Merkle tree illustrated in FIG. 9 is the third super block SB3 and another super block is the second super block SB2.

When the third super block SB3 is erased, a random hash value RH corresponding to a new erase count EC is added as a leaf node LEAF of the Merkle tree, and as the root node ROOT of the Merkle tree is updated, the private key PK3 corresponding to the third super block SB3 may be updated.

In addition, even when the erase count EC of the third super block SB3 does not change, the private key PK3 corresponding to the third super block SB3 may be updated by the update of the private key PK2 of the second super block SB2.

As a result, even when the erase count EC of one super block SB changes, the private keys PK corresponding to the plurality of super blocks SB may be updated, and by updating the plurality of keys PK corresponding to the plurality of super blocks SB, the level of credibility certification between the host device 10 and the storage device 100 may be increased.

Figure 10:
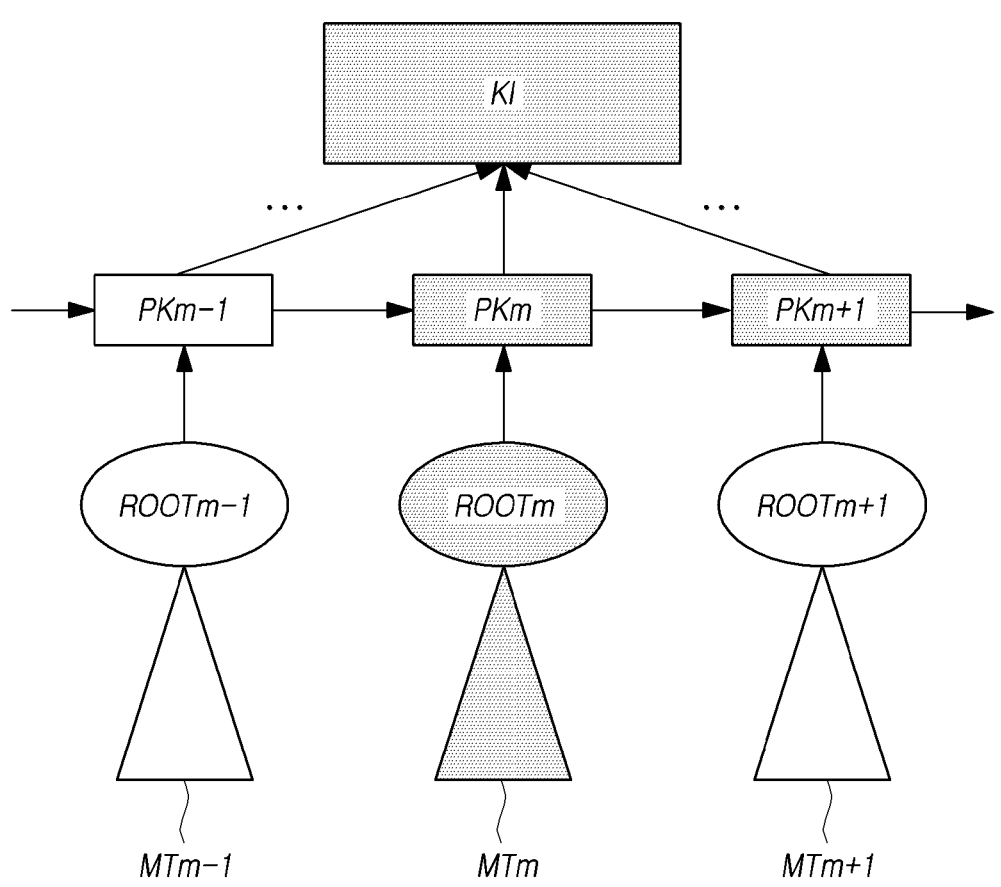
FIG. 10 is a diagram illustrating private key information updated when a Merkle tree is updated according to an embodiment of the disclosure.

FIG. 10 is a diagram illustrating private key information updated when a Merkle tree is updated according to an embodiment of the disclosure.

Referring to FIG. 10, Merkle trees MT corresponding to super blocks SB may have a block-chain structure.

When the Merkle trees MT corresponding to the super blocks SB form a block-chain structure, a structure may be formed in which an mth private key PKm is updated on the basis of an (m−1)th private key PKm−1 corresponding to an (m−1)th super block SBm−1, and a rood node ROOTm of an mth Merkle tree MTm corresponding to an mth super block SBm and an (m+1)th private key PKm+1 is updated on the basis of the mth private key PKm and a root node ROOTm+1 of an (m+1)th Merkle tree MTm+1.

Assuming that the mth super block SBm is erased by a command of a controller 120, an erase count EC of the mth super block SBm is increased by 1. The controller 120 may generate a random hash value by hashing the increased erase count EC and a seed SEED according to the mth super block SBm, and may add the random hash value as a leaf node of the mth Merkle tree MTm.

The controller 120 updates the mth Merkle tree MTm by reflecting the added leaf node, and also updates the root node ROOTm of the mth Merkle tree MTm.

The controller 120 updates the mth private key PKm according to the update of the root node ROOTm, and, in a chained manner, updates the (m+1)th private key PKm+1 and other private keys coupled to the (m+1)th private key PKm+1.

The controller 120 newly updates the private key information KI by reflecting the updated private keys PKm, PKm+1, . . . . The controller 120 may store the updated private key information KI in the memory 110. Also, the controller 120 may transmit the updated private key information KI' to the external device.

The host device 10 may use the updated private key information KI' received from the controller 120, for credibility certification of the storage device 100.

When the Merkle trees MT are configured in a block-chain structure, other private keys are updated in a chained manner by update of one root node ROOT.

After a storage device 100 is decoupled from the external device, a change occurs in an erase count EC of at least one super block SB by performing an additional operation, a plurality of private keys PK included in private key information KI may be updated in a chained manner. As a result, it is difficult to disable credibility certification by modifying the private key information KI in any one of the host device 10 and the storage device 100. Accordingly, the level of credibility certification between the host device 10 and the storage device 100 may be further elevated.

Figure 11:
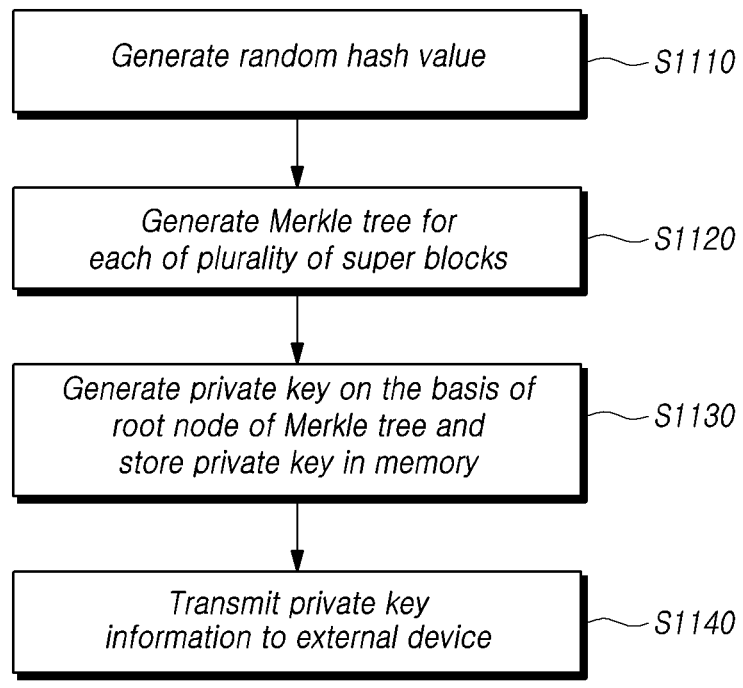
FIG. 11 is a diagram illustrating a method for operating a storage device according to an embodiment of the disclosure.

FIG. 11 is a diagram illustrating a method for operating a storage device according to an embodiment of the disclosure.

Referring to FIG. 11, a method for operating a storage device 100 may include generating a random hash value by hashing an erase count and a seed of each of a plurality of super blocks (S1110).

The method for operating the storage device 100 may include generating a Merkle tree in which the random hash value is a leaf node, for each of the plurality of super blocks (S1120).

The method for operating the storage device 100 may include generating a private key of each of the plurality of super blocks on the basis of the root node of the Merkle tree of each of the plurality of super blocks and storing the private key in a memory (S1130).

The method for operating the storage device 100 may include transmitting private key information including the private key of each of the plurality of super blocks to an external device (S1140).

The method for operating the storage device 100 may further include receiving a credibility certification request from the external device, transmitting a plurality of private keys and one or more dummy keys stored in the memory 110 to the external device in response to the credibility certification request, and setting one mode of a normal mode and an emergency mode on the basis of a credibility certification result corresponding to the credibility certification request.

The method for operating the storage device 100 may further include increasing, when one super block among the plurality of super blocks is erased, the erase count of the erased super block, adding a random hash value corresponding to the increased erase count as a leaf node of a Merkle tree of the erased super block, and updating the Merkle tree of the erased super block and the private key of the erased super block.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A computing device comprising:
    a storage device configured
        to generate a random hash value by hashing an erase count and a seed of each of a plurality of super blocks,
        to generate a Merkle tree in which the random hash value is a leaf node, for each of the plurality of super blocks,
        to generate a plurality of private keys corresponding to the plurality of super blocks, respectively, on the basis of root nodes of Merkle trees of the plurality of respective super blocks, and
        to transmit private key information including the plurality of private keys to a host device,
        wherein the erase count of each of the plurality of super blocks is a value increased when the each of the plurality of super blocks is erased.

2. The computing device according to claim 1, further comprising:
    the host device configured
    to transmit a credibility certification request to the storage device, to compare a plurality of private keys received as a response to the credibility certification request and previously received private key information, and to transmit a credibility certification result to the storage device.

3. The computing device according to claim 2, wherein the seed is a randomizing seed that is used for the storage device to randomize data received from the host device.

4. The computing device according to claim 2, wherein the host device transmits the credibility certification request during a boot sequence of the storage device.

5. The computing device according to claim 4, wherein the storage device is set to a normal mode or an emergency mode according to the credibility certification result.

6. The computing device according to claim 1, wherein the private key information includes private keys of the plurality of respective super blocks, one or more dummy keys and the number of private keys.

7. The computing device according to claim 6, wherein, when transmitting a plurality of private keys as a response to a credibility certification request from the host device, the storage device further includes and transmits one or more dummy keys.

8. A storage device comprising:

a memory including a plurality of memory blocks that are divided into a plurality of super blocks; and a controller configured to generate a random hash value by hashing an erase count and a seed of each of the plurality of super blocks, to generate a Merkle tree in which the random hash value is a leaf node, for each of the plurality of super blocks, to generate private keys corresponding to the plurality of super blocks, respectively, on the basis of root nodes of Merkle trees of the plurality of respective super blocks and store the private keys in the memory, and to transmit private key information including the private keys to an external device, wherein the erase count of each of the plurality of super blocks is a value increased when the each of the plurality of super blocks is erased.

9. The storage device according to claim 8, wherein, when a first super block is erased among the plurality of super blocks, the controller increases an erase count of the first super block, adds a random hash value corresponding to the increased erase count as a leaf node of a Merkle tree corresponding to the first super block, and updates the Merkle tree corresponding to the first super block and a private key corresponding to the first super block.

10. The storage device according to claim 8, wherein a private key of a third super block among the plurality of super blocks is generated on the basis of a root node of a Merkle tree of the third super block and a private key of a second super block.

11. The storage device according to claim 10, wherein the controller updates the private key of the second super block, and thereafter, updates the private key of the third super block on the basis of the updated private key of the second super block and the root node of the Merkle tree of the third super block.

12. The storage device according to claim 11, wherein, when at least one private key among private keys of the plurality of respective super blocks is updated, the controller transmits private key information including the updated private key to the external device.

13. The storage device according to claim 8, wherein the private key information further includes the number of private keys included in the private key information and one or more dummy keys.

14. The storage device according to claim 8, wherein the controller receives a credibility certification request from the external device, and, as a response to the credibility certification request, transmits private keys of the plurality of respective super blocks to the external device, by further including one or more dummy keys.

15. The storage device according to claim 14, wherein the controller receives a credibility certification result corresponding to the credibility certification request from the external device, and is set to a normal mode or an emergency mode according to the credibility certification result.

16. The storage device according to claim 15, wherein the credibility certification request is received during a boot sequence operation of the controller.

17. The storage device according to claim 8, wherein the seed is a randomizing seed that is used for the controller to randomize data received from the external device.

18. A method for operating a storage device, comprising:

generating a random hash value by hashing an erase count and a seed of each of a plurality of super blocks;

generating a Merkle tree in which the random hash value is a leaf node, for each of the plurality of super blocks;

generating a private key of each of the plurality of super blocks on the basis of a root node of the Merkle tree of each of the plurality of super blocks, and storing the private key in a memory; and transmitting private key information including the private key of each of the plurality of super blocks to an external device, wherein the erase count of each of the plurality of super blocks is a value increased when the each of the plurality of super blocks is erased.

19. The method according to claim 18, further comprising:

receiving a credibility certification request from the external device;

transmitting a plurality of private keys and one or more dummy keys stored in the memory to the external device in response to the credibility certification request; and setting a normal mode or an emergency mode on the basis of a credibility certification result corresponding to the credibility certification request.

20. The method according to claim 18, further comprising:

increasing, when one super block among the plurality of super blocks is erased, an erase count of the erased super block;

adding a random hash value corresponding to the increased erase count as a leaf node of a Merkle tree of the erased super block; and updating the Merkle tree of the erased super block and a private key of the erased super block.

* * * * *